Feb. 20, 1951      H. J. HIBSHMAN      2,542,520
ETHYLENE EXTRACTION
Filed Oct. 16, 1945
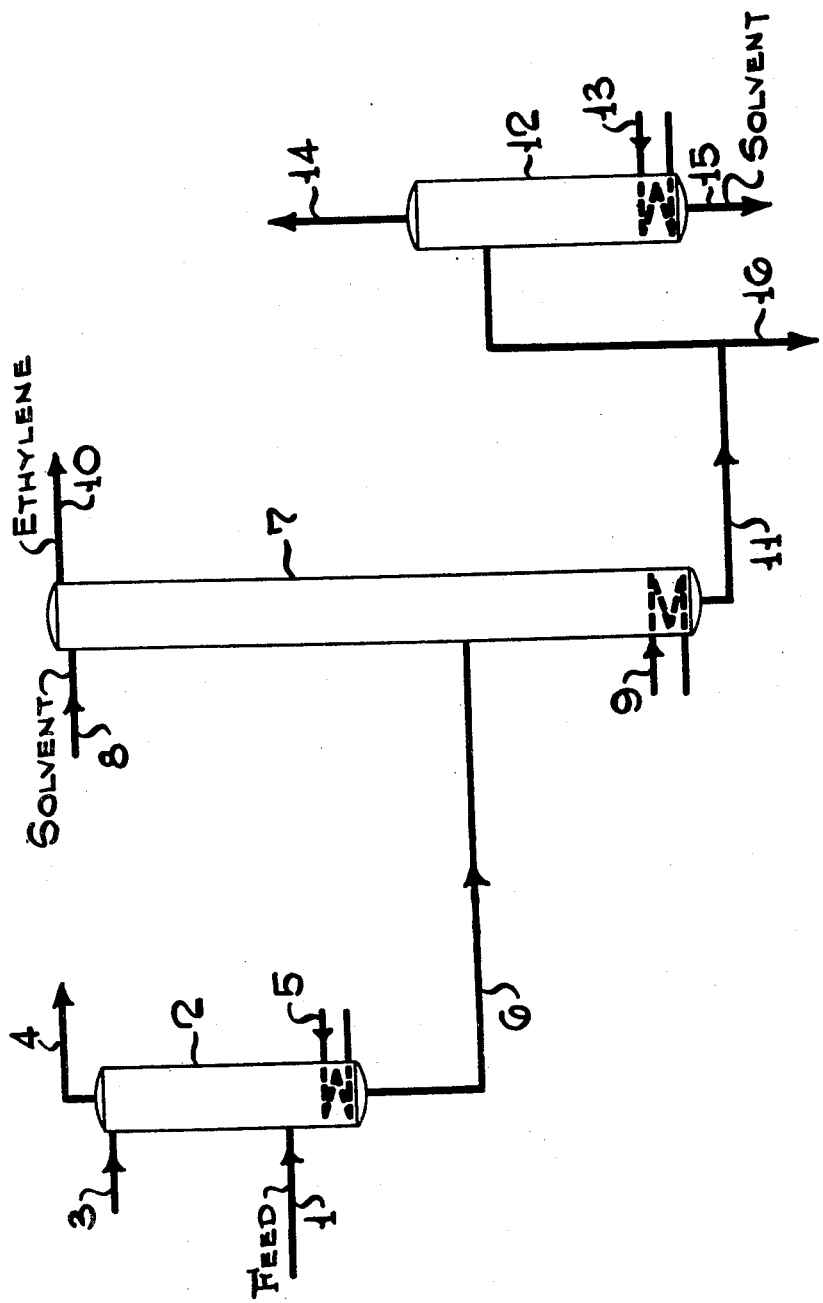
Henry J. Hibshman Inventor
By P. L. Young Attorney Patented Feb. 20, 1951

2,542,520

UNITED STATES PATENT OFFICE 2,542,520

ETHYLENE EXTRACTION

Henry J. Hibshman, Plainfield, N. J., assignor to Standard Oil Development Company, a corporation of Delaware Application October 16, 1945, Serial No. 622,602

3 Claims. (Cl. 183—115)

This invention relates to the extraction and purification of ethylene from a mixture of light hydrocarbons, and particularly to the separation of ethylene from methane and lower boiling materials.

Ethylene generally occurs in mixtures of methane, ethane, propane and propylene, as well as higher boiling hydrocarbons, and it is often necessary to separate the ethylene in substantially a pure form. It is known that ethylene may be separated by distillation from these impurities. However, temperatures as low as —130° F. are required in order to produce methane refluxes, since no fractionation can be obtained above the critical temperature of methane. Temperatures in the order of —40° F. are required in order to produce refluxes of ethylene, for the same reason. In addition to these extremely low temperatures the fractionation requires pressures in the order of 50 to 700 pounds per square inch.

A typical fractionator battery for the purification of ethylene consists of at least two towers. In the first, methane is separated from $C_2$ and higher boiling components; in the second, $C_2$ hydrocarbons are separated from $C_3$ and higher boiling constituents. The low temperatures and pressures required in this type of operation are obviously a disadvantage.

Another method that may be used for the purification of ethylene is that of absorption. the necessary product purity. The disadvantages of using absorption to separate ethylene are the separation of each heavy component from all of the methane gas which throws a large load on each absorber, and, second, since, to obtain the necessary product purity, the solvent must be stripped completely after each absorption, unusually large quantities of absorber oil must be recycled and stripped.

The object of the present invention is to readily separate ethylene from the hydrocarbon mixture in a sequence of operations in which the methane and lighter components are removed first and then the ethylene is removed from the remaining higher boiling components thus eliminating the necessity for handling methane in both operations.

Another object of the invention is to successively remove, first, the lowest boiling constituent, and then remove the higher boiling constituents while using the major quantities of the solvent in more than one step without intermediate stripping, thus requiring a minimum amount of solvent stripping.

The conditions required for the necessary separations for producing better than 90% purity, and 90% recovery of ethylene from a hydrocarbon mixture containing from one to at least three carbon atoms to the molecule are shown in the following table:

| Separation Between | $CH_4$ and $C_2H_4+$ | $C_2H_4$ and $C_2H_6+$ | $C_2H_6+$ and Solvent |
| --- | --- | --- | --- |
| Proposed Process | Extractive Distillation | Extractive Distillation | Conventional Stripping. |
| Solvent | $C_5$ to $C_8$ Naphtha | $C_5$ to $C_8$ Naphtha | None. |
| Operating Conditions: | | | |
| Plates (Theoretical) | 15 | 40 | 10. |
| Temperature, °F | 100 | 100 | 300–550. |
| Reflux Ratio | 0 | 0 | 0. |
| Pressure, #/Sq. In | 40–250 | 90–500 | 15–250. |
| Solvent/Feed Wt. Ratio | 90–10/1 | 10–1.5/1 | |

In this process the gaseous ethylene-containing hydrocarbon mixture is successively passed countercurrently to an absorber oil, that is, for example, an alkylate fraction consisting of primarily $C_8$ hydrocarbons. In the first countercurrent treatment the highest boiling hydrocarbons, that is, $C_3$ and higher, present are absorbed in the oil, the lighter hydrocarbons passing through the absorber. In the second absorber the $C_2$ hydrocarbons are absorbed in the oil while methane gas and lower boiling constituents pass through the absorbers. In both absorbers sufficient recycle of the heavy component is used to produce For purposes of comparison, the following table shows the order of magnitude of the temperatures and pressure required to produce reflux in the tower without the use of a solvent:

| Critical Constants | $CH_4$ | $C_2H_4$ |
| --- | --- | --- |
| Pressure, #/sq. in | 690 | 765 |
| Temperature, °F | —115 | +49 |

It is apparent that a considerable saving in refrigeration and pressure is achieved in the process according to the present invention.

According to this invention the separation of ethylene from an ethylene-containing feed stock will be more clearly understood upon reading the following description with reference to the accompanying drawing which illustrates the simplest, although not the preferred, method of operation:

Feed stock containing ethylene is introduced, by means of pipe 1, at approximately the center of a conventional 20- to 40-plate fractionating tower 2. Packed towers may be used. Into the upper part of the tower the solvent, consisting of $C_6$ to $C_{10}$ paraffin hydrocarbons, is passed by means of pipe 3. The ratio of the solvent and the feed stock is preferably between 500 to 1500 weight per cent of the solvent to the feed stock. A temperature of about 100° F. is maintained in the tower 2 by means of steam coil 5, or any other conventional type of reboiler, with a pressure ranging from 44 to 250 pounds per square inch. The feed stock and solvent are passed in countercurrent flow in the tower. Methane and lower boiling constituents, such as hydrogen, are removed from the top of the tower by means of pipe 4. The solvent, ethylene and constituents boiling at a temperature above that of ethylene are passed into tower 7 by means of pipe 6.

Additional solvent is introduced into the top of this tower by means of pipe 8, about 1½ to 10 parts of the solvent for each part of ethylene. The tower contains from 40 to 60 plates and is maintained at a pressure of 90 to 500 pounds per square inch. A temperature of 100° F. is maintained by means of steam coil 9, or other conventional type of reboiler.

Substantially pure ethylene is removed from the top of the tower by means of pipe 10 and the residual solvent is removed from the bottom of the tower by means of pipe 11 and passed to tower 12 which is maintained, likewise, at a temperature of 100° F. by means of steam coil 13, or other conventional type of reboiler, and a pressure of 15 to 250 pounds per square inch is maintained in this tower. The residual constituents of the feed stock, such as ethane, propylene and propane, may be distilled over through pipe 14 and the solvent removed from the bottom of the tower by means of pipe 15 may be recycled to towers 2 and 7.

The incompletely stripped solvent may be obtained as bottoms from tower 7 by means of pipes 11 and 16.

What is claimed is:

1. The process for separating ethylene from a feed mixture of saturated and unsaturated hydrocarbons containing methane, ethylene, ethane, propane and propylene, which comprises passing said feed mixture into an intermediate part of a fractional distillation zone, passing into an upper part of said zone a liquid hydrocarbon solvent which is higher boiling than ethylene, said solvent being passed into said zone in a weight ratio of 10 to 90 parts for each one part of the feed mixture, maintaining a pressure in the range of 40 to 250 pounds per square inch and a temperature at which the said solvent remains in liquid phase as it passes countercurrently to methane and ethylene in gaseous phase from the feed mixture in said zone, removing the methane in gaseous phase overhead from said zone, passing a liquid solution of the solvent containing dissolved ethylene, ethane, propane and propylene as residual bottoms from said zone into an intermediate part of a second fractional distillation zone, passing additional liquid hydrocarbon solvent higher boiling than ethylene into an upper part of said fractional distillation zone in a weight ratio of 1.5 to 10 parts by weight for each one part of said liquid residual bottoms solution passed thereto, maintaining in the second fractional distillation zone a pressure in the range of 90 to 500 pounds per square inch and a temperature at which the solvent remains in liquid phase as it passes countercurrently to gaseous ethylene evolved from said solution in said second fractional distillation zone, removing the ethylene in gaseous phase overhead from the top of said second fractional distillation zone, and withdrawing as residual bottoms from said second zone the liquid solvent containing ethane, propane and propylene from the feed mixture dissolved therein.

2. The process as described in claim 1 in which the liquid hydrocarbon solvent passed into the upper part of said fractional distillation zone is a naphtha fraction containing hydrocarbons having 3 to 8 carbon atoms per molecule.

3. The process for separating purified ethylene from a feed mixture containing hydrogen, methane, ethylene, ethane, propane and propylene, which comprises passing said feed mixture into an intermediate part of a first fractional distillation zone, passing a liquid naphtha solvent of $C_3$ to $C_8$ hydrocarbons into an upper part of said zone, said solvent being passed into said zone in a weight ratio of 10 to 90 parts for each one part of the feed mixture introduced into said zone, maintaining in said zone a pressure in the range of 40 to 250 pounds per square inch and a temperature of 100° F., passing the solvent maintained in liquid phase countercurrently to gaseous hydrogen, methane, and ethylene flowing upwardly in said zone from the feed mixture, removing hydrogen and gaseous methane as overhead from said zone, passing a residual liquid solution of the solvent containing dissolved ethylene, ethane, propane and propylene in solution from a bottom part of said first zone into an intermediate part of a second fractional distillation zone, passing additional liquid naphtha solvent of $C_3$ to $C_8$ hydrocarbons into an upper part of said second fractional distillation zone in a weight ratio of 1.5 to 10 parts for each one part of said solution introduced into an upper part of said second zone, maintaining in said second fractional distillation zone a pressure in the range of 90 to 500 pounds per square inch and a temperature of 100° F., passing said solvent countercurrently to gaseous ethylene evolved from said solution in said second zone, removing the ethylene in gaseous phase from a top part of said fractional distillation zone, removing the solvent as liquid residue containing the ethane, propane, and propylene dissolved therein from a bottom part of said second zone, and subjecting said liquid residue to further distillation in a third fractional distillation zone to distill ethane, propylene and propane.

HENRY J. HIBSHMAN.

REFERENCES CITED

The following references are of record in the file of this patent:

UNITED STATES PATENTS

| Number | Name | Date |
|---|---|---|
| 1,465,600 | Eldred | Aug. 21, 1923 |
| 1,919,752 | Schmidt | July 25, 1933 |
| 2,325,379 | Durrum | July 27, 1943 |